(12) United States Patent
Konitzer et al.

(10) Patent No.: US 10,524,460 B1
(45) Date of Patent: Jan. 7, 2020

(54) ICE FISHING INDICATOR DEVICE

(71) Applicant: Konitzer Manufacturing LLC, Chilton, WI (US)

(72) Inventors: Kevin David Konitzer, Chilton, WI (US); William Charles Konitzer, Little Chute, WI (US)

(73) Assignee: Konitzer Manufacturing LLC, Chilton, WI (US)

( * ) Notice: Subject to any disclaimer, the term of this patent is extended or adjusted under 35 U.S.C. 154(b) by 372 days.

(21) Appl. No.: 15/457,361

(22) Filed: Mar. 13, 2017

Related U.S. Application Data

(60) Provisional application No. 62/429,032, filed on Dec. 1, 2016.

(51) Int. Cl.
| | | |
|---|---|---|
| *A01K 97/12* | (2006.01) | |
| *A01K 97/01* | (2006.01) | |
| *A01K 91/06* | (2006.01) | |
| *A01K 89/08* | (2006.01) | |
| *G08B 21/18* | (2006.01) | |

(52) U.S. Cl.
CPC ............ *A01K 97/125* (2013.01); *A01K 89/08* (2013.01); *A01K 91/065* (2013.01); *A01K 97/01* (2013.01); *A01K 97/12* (2013.01); *G08B 21/18* (2013.01)

(58) Field of Classification Search
CPC ...... A01K 97/12; A01K 97/125; A01K 97/00; A01K 97/01; A01K 91/065
USPC .......................................... 43/17, 16, 4, 19.2
See application file for complete search history.

(56) References Cited

U.S. PATENT DOCUMENTS

| | | | | |
|---|---|---|---|---|
| 2,618,091 A | * | 11/1952 | Sheraski ................. | A01K 97/12 126/25 R |
| 2,883,784 A | * | 4/1959 | Obernolte .............. | A01K 97/01 126/271.3 |
| 3,213,561 A | * | 10/1965 | Roemer ................. | A01K 97/01 43/17 |
| 3,275,260 A | * | 9/1966 | Woollen ............. | A01K 89/0102 242/305 |
| 3,359,673 A | * | 12/1967 | Roemer ................. | A01K 97/01 43/17 |
| 3,453,766 A | * | 7/1969 | Hunt ..................... | A01K 97/125 43/17 |

(Continued)

FOREIGN PATENT DOCUMENTS

| | | | | |
|---|---|---|---|---|
| CA | 2340360 A1 | * | 12/2000 | ............ A01K 97/01 |
| CA | 2785337 A1 | * | 2/2014 | ............ A01K 97/01 |

(Continued)

*Primary Examiner* — Darren W Ark
(74) *Attorney, Agent, or Firm* — Brannen Law Office, LLC

(57) ABSTRACT

The present invention relates to an ice fishing indicator device and in particular to an ice fishing indicator device having an improved trigger and or jigging mechanisms. The device has a housing that holds a can for a candle or heat source. A heat shield protects a power box. The jigging mechanism has a motor, a rotating arm, an offset weight and a jigging arm, wherein a wiggle is produced during operation. A reel assembly has a trigger. The trigger can be mechanical via direct contact or contactless. A reel lug can contact a trigger or pass near a contactless sensor. The trigger can cause a flag to deploy via an electrically controlled flag release. The trigger can also cause a communication device to send a signal. The communication device can be held in a communication box on the interior of the housing.

17 Claims, 17 Drawing Sheets

(56) References Cited

U.S. PATENT DOCUMENTS

| | | | | |
|---|---|---|---|---|
| 3,545,118 A * | 12/1970 | Stelmach | A01K 97/01 | 126/271.3 |
| 3,599,369 A * | 8/1971 | Carlson | A01K 97/01 | 43/17 |
| 3,645,029 A * | 2/1972 | Roemer | A01K 97/01 | 43/17 |
| 4,246,716 A * | 1/1981 | Elmer | A01K 97/01 | 43/17 |
| 4,310,983 A * | 1/1982 | Irvin | A01K 97/01 | 43/17 |
| 4,787,166 A * | 11/1988 | Vogt | A01K 97/01 | 43/17 |
| 4,811,514 A * | 3/1989 | Jordan | A01K 91/06 | 43/15 |
| 4,845,878 A * | 7/1989 | Hackel | A01K 97/01 | 43/17 |
| 4,928,419 A * | 5/1990 | Forrestal | A01K 97/01 | 43/17 |
| 4,934,090 A * | 6/1990 | Storey | A01K 97/01 | 43/16 |
| 4,942,687 A * | 7/1990 | Post | A01K 97/01 | 43/17 |
| 4,945,668 A * | 8/1990 | Keller | A01K 97/01 | 43/17 |
| 4,980,986 A * | 1/1991 | Harper | A01K 97/01 | 43/17 |
| 4,996,788 A * | 3/1991 | Wieting | A01K 97/01 | 43/17 |
| 5,020,263 A * | 6/1991 | Werner | A01K 97/01 | 43/17 |
| 5,074,072 A * | 12/1991 | Serocki | A01K 97/01 | 43/16 |
| 5,097,618 A * | 3/1992 | Stoffel | A01K 97/125 | 43/17 |
| 5,540,010 A * | 7/1996 | Aragona | A01K 91/065 | 43/19.2 |
| 5,570,534 A * | 11/1996 | Ford | A01K 91/065 | 43/15 |
| 5,598,656 A * | 2/1997 | Strasser | A01K 97/01 | 43/17 |
| 5,996,268 A * | 12/1999 | Buczkowski | A01K 97/125 | 43/17 |
| 6,021,596 A * | 2/2000 | Heuke | A01K 91/065 | 43/19.2 |
| 6,088,945 A * | 7/2000 | Sanderfoot | A01K 97/01 | 126/271.1 |
| 6,170,189 B1 * | 1/2001 | Klein | A01K 97/10 | 43/17 |
| 6,408,561 B1 * | 6/2002 | Winter | A01K 97/125 | 43/17 |
| 6,487,812 B2 * | 12/2002 | Johnson | A01K 97/01 | 43/17 |
| 6,688,033 B2 * | 2/2004 | Shaff | A01K 97/01 | 43/17 |
| 7,008,086 B1 * | 3/2006 | Kell | A01K 97/01 | 362/191 |
| 7,185,456 B1 * | 3/2007 | Schoenecker | A01K 97/01 | 43/17 |
| 7,207,133 B2 * | 4/2007 | Schiemann | A01K 97/01 | 43/17 |
| 7,364,105 B1 * | 4/2008 | Yeh | A01K 89/01 | 242/305 |
| 8,176,672 B1 * | 5/2012 | Schmeisser | A01K 97/01 | 43/16 |
| 8,497,778 B1 * | 7/2013 | Martin | A01K 97/01 | 242/223 |
| 8,839,548 B2 * | 9/2014 | Manlick | A01K 97/01 | 43/17 |
| 9,398,764 B2 * | 7/2016 | Trout | A01K 97/125 | |
| 9,420,775 B1 * | 8/2016 | Ridler | A01K 97/125 | |
| 10,188,088 B2 * | 1/2019 | Zdroik | A01K 97/01 | |
| 10,398,136 B2 * | 9/2019 | Bricko | A01K 97/125 | |
| 2007/0011937 A1 | 1/2007 | Roh et al. | | |
| 2014/0237886 A1 * | 8/2014 | Taboada | A01K 97/125 | 43/4.5 |
| 2016/0100564 A1 * | 4/2016 | Perez | A01K 97/125 | 43/4.5 |

FOREIGN PATENT DOCUMENTS

| | | | | |
|---|---|---|---|---|
| FR | 2657752 A1 * | 8/1991 | | A01K 97/125 |
| GB | 2324696 A * | 11/1998 | | A01K 97/125 |

* cited by examiner

ICE FISHING INDICATOR DEVICE

This United States utility patent application claims priority on and the benefit of provisional application No. 62/429,032 filed Dec. 1, 2016, the entire contents of which are hereby incorporated herein by reference.

BACKGROUND OF THE INVENTION

1. Field of the Invention

The present invention relates to an ice fishing indicator device and in particular to an ice fishing indicator device having an improved trigger and jigging mechanism.

2. Description of the Related Art

Many ice fishing devices exist. Some examples include:

U.S. Pat. No. 2,618,091 to Sheraski is titled Fishing Signal.

U.S. Pat. No. 2,883,784 to Obernolte is titled Ice Fishing Equipment.

U.S. Pat. No. 3,545,118 to Stelmach is titled Ice Fishing Equipment.

U.S. Pat. No. 4,945,668 to Keller is titled Ice Fishing Apparatus with Heating Chamber. This patent shows an ice fishing apparatus incorporating a housing with a heating chamber having a heat source such as a candle for preventing the formation of ice in an ice fishing hole as well as for preventing the freezing of the fishing reel. A tip up system is mounted on the housing so as to signal a fisherman that a fish has been hooked.

U.S. Pat. No. 4,980,986 to Harper is titled Fishing Apparatus. This patent shows a fishing apparatus intended primarily for ice fishing has a housing, a windowed door on the housing, an angling aperture in a bottom of the housing, a reel inside the housing, a flagpole and an electric light on the outside of the housing, and discrete actuators for the flag and the light; the actuators are engaged by a spool of the reel as line is taken out by a fish, and the flagpole is released to pop up and/or the light is turned on. A transparent solar energy collecting panel is provided on one side and the top of housing enabling solar energy to be collected inside the housing, the housing keeps an ice fishing hole from freezing up.

U.S. Pat. No. 4,996,788 to Wieting et al. is titled Ice Fishing Alarm. This patent shows an ice fishing alarm is set forth wherein a platform is provided to accommodate a spool rotatably mounted onto a downwardly depending shaft rotatably mounted to the platform wherein the shaft is provided with an "L" shaped bracket whereupon a fish strike will rotate the bracket and shaft disengaging the shaft from an overlying downwardly oriented flag. Release of said flag vertically orients the flag and effects contact with an electrical circuit to illuminate a luminescent bulb positioned axially of a transparent hollow cylinder supporting the flag. The hollow cylinder is formed to communicate with an electrical transmitter and transmit a signal to a remote receiver while simultaneously completing a circuit to eliminate the aforenoted luminescent device.

U.S. Pat. No. 6,088,945 to Sanderfoot is titled Ice Fishing System. This patent shows an ice fishing system comprising a variable stiffness jigging mechanism inside a housing. The jigging mechanism includes an oscillating arm having a flexible tube that supports and jigs the fishing line. The fishing line is draped over a flexible line guide. The flexibilities of the flexible tube and the line guide are chosen to suit the particular kind of fish to be caught. A heat exchanger in the housing has a slidable glass door that protects a burner from the wind as well as provides illumination inside the housing. The heat exchanger is spaced from the housing walls to provide adequate air circulation around it. A lid of the housing is strong enough for a fisherman to kneel on.

U.S. Pat. No. 8,176,672 to Schmeisser is titled Ice Fishing Signaling Device. This patent shows a device for signaling to an ice fisherman that a fish has taken the bait and a method for utilizing the device are disclosed. The device comprises a trigger pivotally attached to a housing. The trigger is balanced horizontally by a fishing line containing a loop adapted for looping and draping over one end of the trigger and one or more balancing and counterbalancing weights. The tugging of a fish taking the bait on the fishing line pulls the line off the trigger which allows the trigger to tip vertically signaling to the fisherman to take action to raise the fishing line.

U.S. Pat. No. 8,839,548 to Manlick et al. is titled Ice Fishing Indicator Device. This patent shows an ice fishing device enclosed in a housing and configured for indicating that a fish has taken the bait is disclosed. The device provides a curved rod having a portion external to the housing and a portion internal to the housing. The portion inside the housing includes a curved end adapted for resting on a handle tip of the fishing spool. The curved end will release from the handle tip when a fish tugs on the fishing line, thereby moving the spool and the handle tip away from the curved end. Once the curved end is released, the curved rod containing a flag repositions to an upright position, alerting the fisherman that the fish is ready to be pulled out of the ice.

United States Patent Application Publication Number 2007/0011937 is titled Automatic Jigging Device for Fishing. This application shows an automatic jigging device for fishing has a motor electrically coupled to a power supply. A current detector detects a current used by the motor. A switch, controlled by the current detector, is in series with the motor and the power supply.

None of the devices shown in these items show all of the many features of the present invention.

SUMMARY OF THE INVENTION

The present invention relates to an ice fishing indicator device and in particular to an ice fishing indicator device having an improved trigger and jigging mechanism. The device has a housing that holds a can for a candle or heat source. A heat shield protects a power box. The jigging mechanism has a motor, a rotating arm, an offset weight and a jigging arm, wherein a wiggle is produced during operation. A reel assembly has a trigger. The trigger can be mechanical via direct contact or contactless. A reel lug can contact a trigger or pass near a contactless sensor. The trigger can cause a flag to deploy via an electrically controlled flag release. The trigger can also cause a communication device to send a signal. The communication device can be held in a communication box on the interior of the housing.

According to one advantage of the present invention, the trigger can add very small amounts of line tension when used with a zero resistance fly wheel. In one embodiment, a lug on an outer lip mechanically contacts a spring trigger to trip a micro switch. There is little force required to trip the micro switch in this preferred embodiment.

In an alternative embodiment, a lug on the outer lip can pass by (zero mechanical contact) with a sensor such as a proximity switch to trigger the alarm. This embodiment adds zero line tension to the line eliminating the risk that a fish can sense that a trigger has been tripped.

According to another aspect of the present invention, the lug can rotationally travel up to 360 degrees prior to tripping the trigger (either contact or contactless). In this regard, minor movements of the reel will not set off the trigger. Further, this allows for an amount of line to be reeled out prior to indicating a fish bite to increase odds that a fish will fully engage the hook prior to the alarm commencing.

According to a further advantage of the present invention, the flag indicator can be deployed via a motor. This further reduces line tension as line tension is not required to release a flag. Further, the use of a motor increases reliability as it prevents freeze-up conditions.

According to a still further advantage yet of the present invention, a communication device is provided. The communication device can be a radio that is turned on when the trigger is tripped. The radio can provide an instant alert of a fish bite over a long distance (several miles or more). There is no need for a direct line of sight to the flag.

The radio is housed in a communication box that has a cover to seal the radio within a protective enclosure. The communication box is internal of the housing wherein it can be kept at an elevated temperature compared to the outside ambient air temperature. This dramatically increases battery life.

According to a still further advantage of the present invention, the radio is rechargeable.

According to an advantage or another aspect of the present invention, a wiggling jigging assembly can be provided. This can be accomplished by introducing an offset weight to an arm that depends from a rotating arm. As the offset weight falls, the jigging assembly follows an irregular path that appears to wiggle the bait.

Other advantages, benefits, and features of the present invention will become apparent to those skilled in the art upon reading the detailed description of the invention and studying the drawings.

DETAILED DESCRIPTION OF THE PREFERRED EMBODIMENTS

Figure 1:
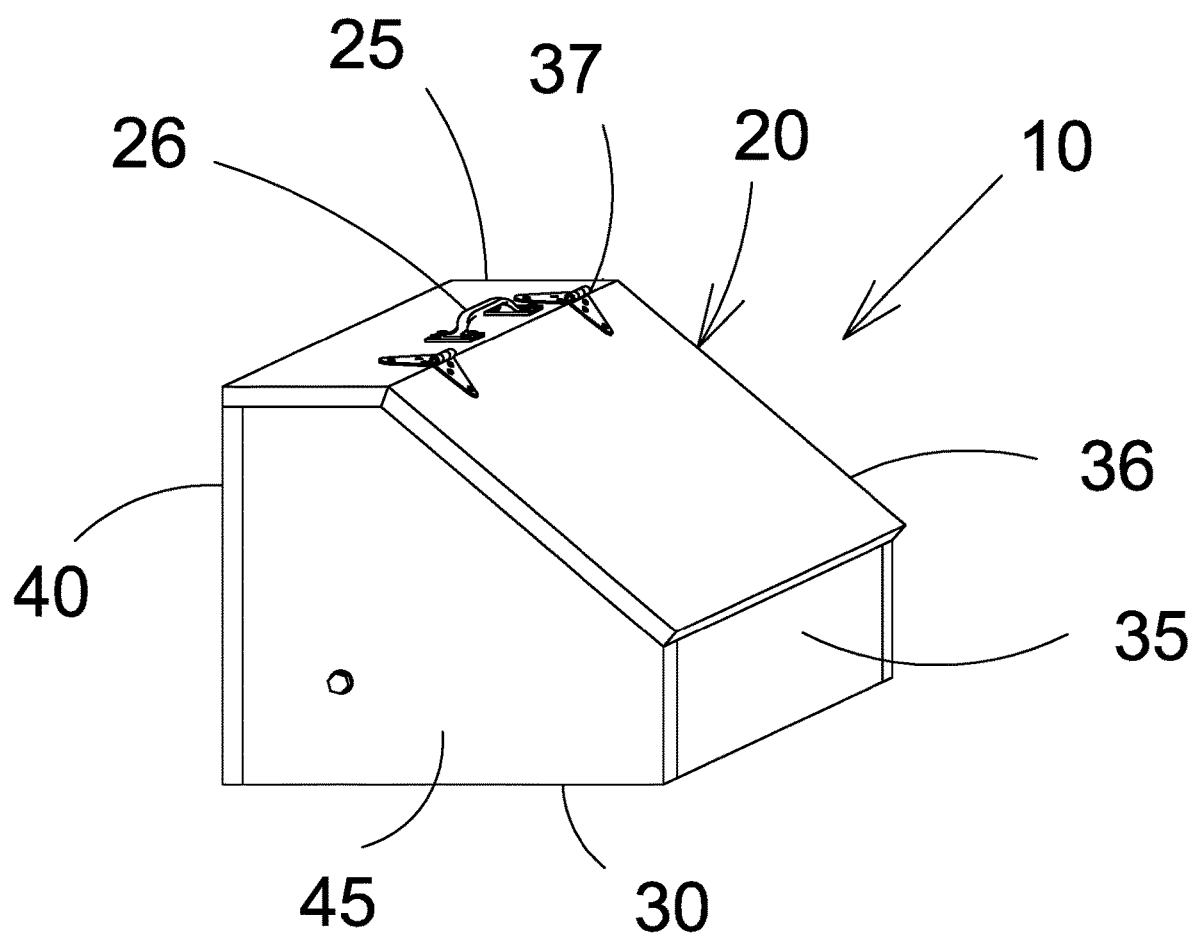
FIG. 1 is a perspective view of a preferred embodiment of the present invention.
Figure 2:
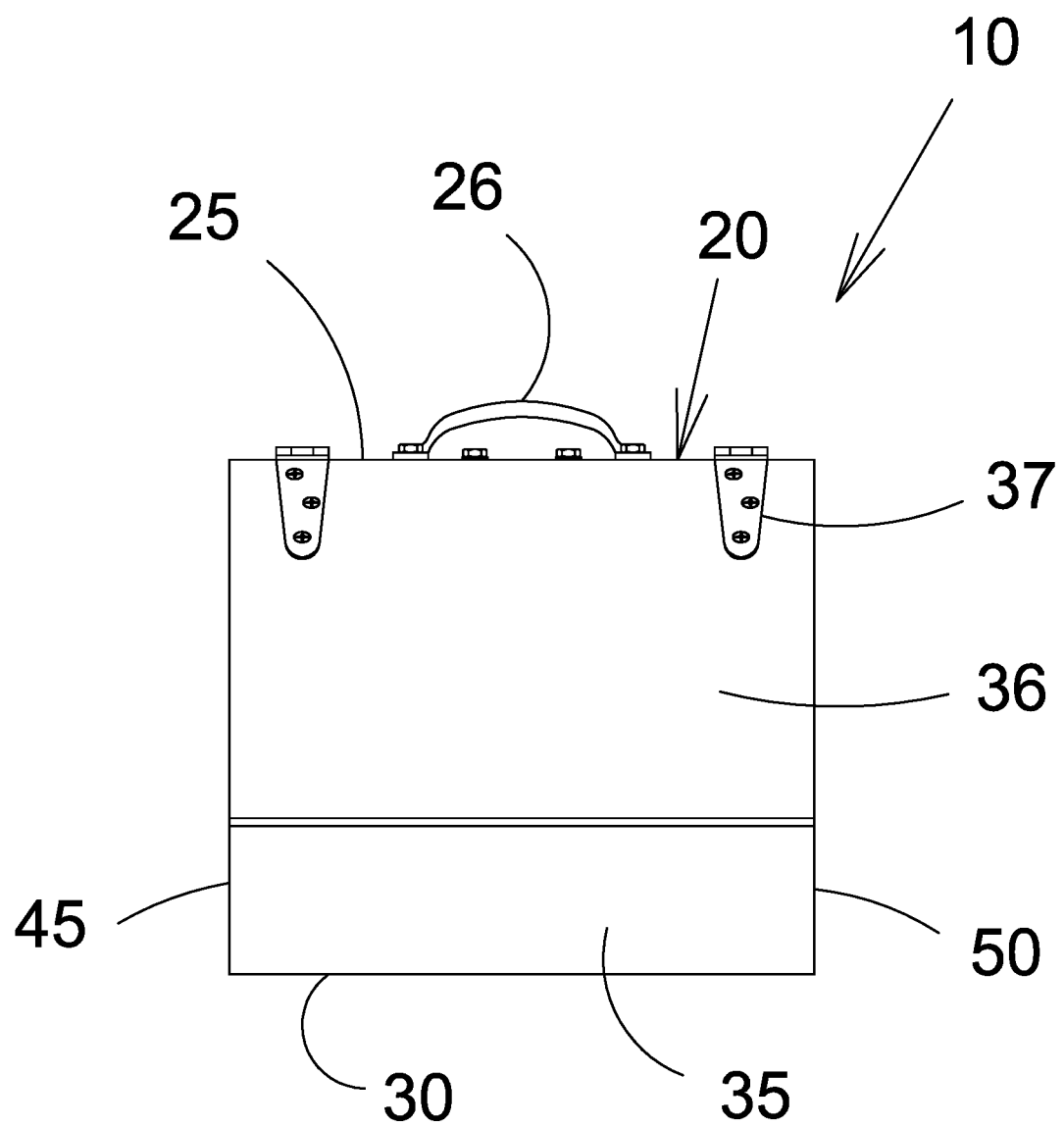
FIG. 2 is a front view of the embodiment illustrated in FIG. 1.
Figure 3:
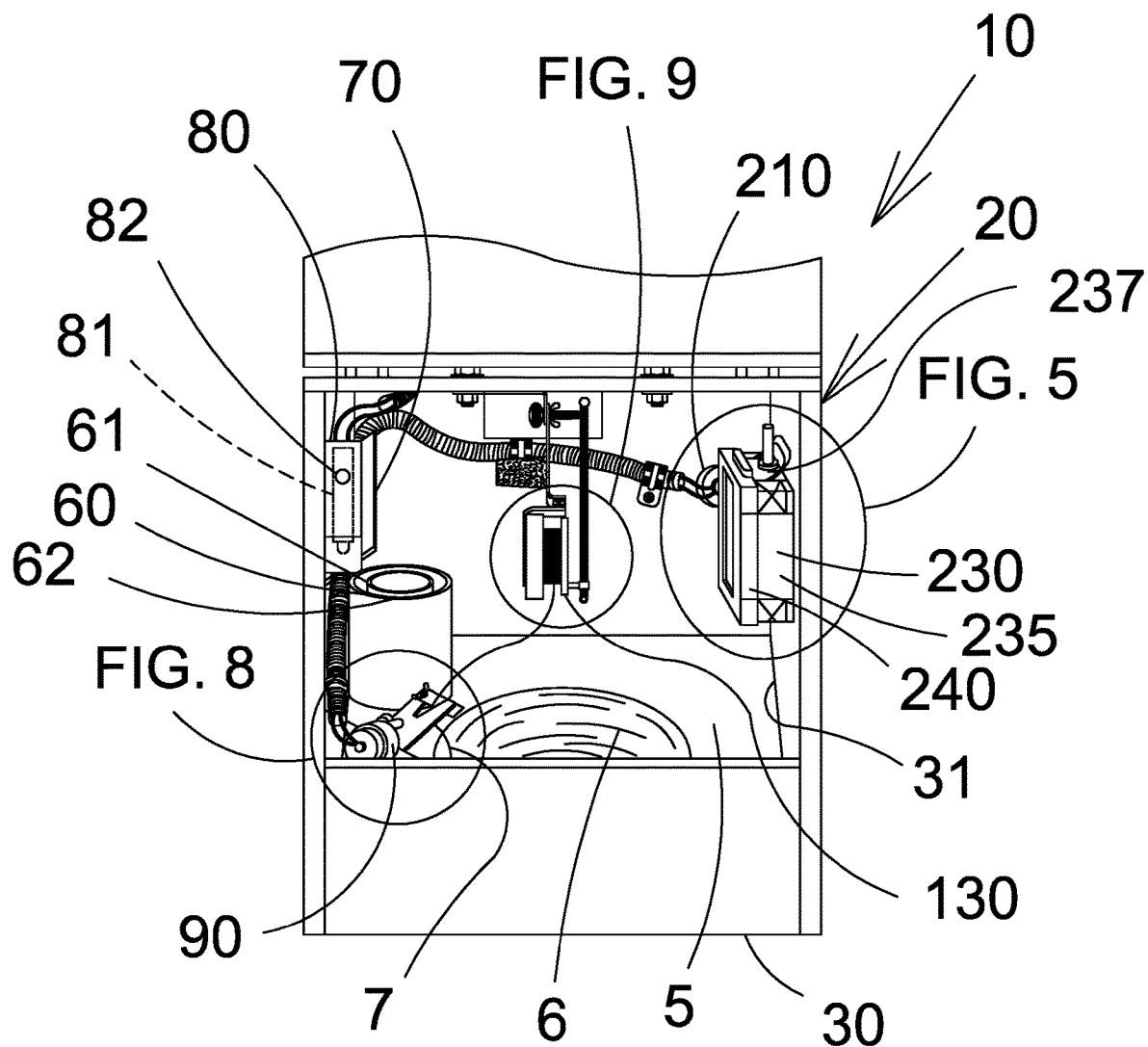
FIG. 3 is similar to FIG. 2, but shows the front lid in an open position with a line connected to a jigging assembly.
Figure 4:
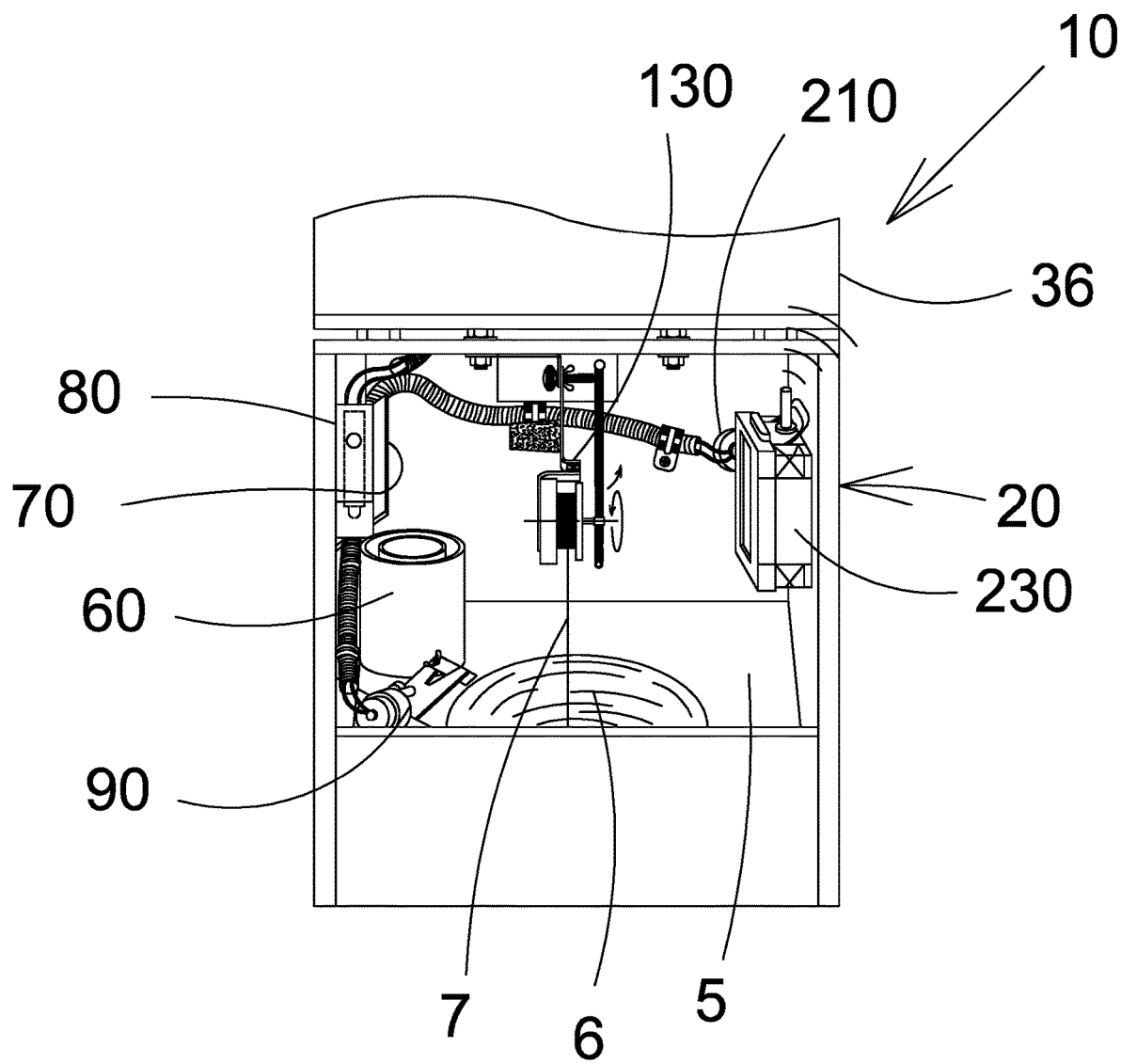
FIG. 4 is similar to FIG. 3, but shows a line disconnected from a jigging assembly.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention is used during ice fishing. Typically, a hole 6 is formed through the ice 5 in any number of ways such as with use of powered or hand operated augers. A fishing line 7 can be fed through the hole 6.

One embodiment of a tip up 10 of the present invention is illustrated in FIGS. 1-14.

The tip up 10 has a housing 20. The housing 20 has a top 25 with a handle 26. The housing also has a bottom 30 that is open with an opening 31. The opening 31 can be sized to match the internal width and depth of the internal chamber. A front 35 is provided having a lid 36 pivotably or movable supported with hinges 37. The lid can be angled relative to a bottom portion of the front 35. The hinges 37 can be fixed to the top 25, preferably with one hinge on each side of the handle 26. A back 40 and two sides 45 and 50, respectively, are further provided. The lid 36 is movable between a closed position and an open position. In the open position, a user has access to the inside of the housing 20 and to the components contained therein. The lid is shown in an open position in FIGS. 3 and 4.

Several components are preferably provided on the inside of the housing 20. One such component is a can 60 having a body 61 with an opening 62. The opening is preferably located at the top of the can 60. A candle or other heat producing device can be placed into the can. The heating device can warm the interior of the housing 20, extending battery life of components and preventing the ice hole from freezing over.

A heat shield 70 is affixed to a sidewall and protects a power box 80 from directly receiving heat from the can 60. The power box 80 has a battery 81 and contains a switch 82. The switch is an on/off switch having an off position and an on position.

A jigging assembly 90 is provided. The jigging assembly is seen in isolation in FIG. 8. The jigging assembly 90 has a motor 95 that is in electrical communication with the power box 80. A rotating arm 100 is provided having a proximal end 101 and a distal end 102. The proximal end 101 is connected to the motor and the distal end 102 orbits about the proximal end under operation of the motor 95. A bar 105 is provided. A weight 110 depends from the bar 105. The weight 110 is connected to the bar 105 at an offset connection 111. The bar 105 is rotatably connected to the distal end 102 of the rotating arm 100. In this regard, the weight 110 remains below the bar 105 as the bar rotates due to gravity. A jigging arm 120 is connected to and extends from the weight 110. The jigging arm is generally angled upwards as it extends from the weight. The jigging arm 120 has a first end 121 and a second end 122. The first end is connected to the weight 110. Two fingers 123 are at the second end 122. A line hold 124 spans between the fingers 123. The line hold 124 can provide a relatively small amount of resistance to keep a line 7 between the fingers. The line hold 124 can be overcome with a slight amount of line tension on the line 7.

In use, the motor 95 turns the rotating arm 100 when switch 82 is moved to the on position. The distal end 102 passes in an orbital path around the first end 101. The weight 110 also passes in a generally orbital path that generally corresponds to the path of the distal end 102 of the rotating arm. The offset connection 111 of the weight, and the internal friction between the bar 105 and the rotating arm 100 introduce a wiggle in the weight wherein the weight fails to pass in a smooth orbit. The wiggle and the orbit are translated to the second end 122 of the jigging arm. This irregular motion is imparted onto the line 7 so that a bait on the line does not move in a simple motion.

A reel assembly 130 is further provided. The reel assembly is seen in isolation in FIGS. 9 and 10. A support arm 140 is provided having a first end 141 and a second arm 142. The first end 141 is pivotally connected to a hanger on the top 25 of the housing. The second end 142 is preferably angled approximately 90 degrees relative to the first end 141. A cork 145 is connected to the support arm 140. A hook on the end of a line 7 can be stored on the cork 145. A reel 150 is provided. The reel 150 has a base 151 with a rotating hub 152. The reel 150 can be a low resistance reel 150. The hub 152 has an outer lip 153. A lug 154 can be fixed to the outer lip. One use of the lug 154 is to wind a line onto the reel 150. The lug passes in an orbital path when a line 7 is unwinding. The support arm 140 can be adjusted in position so that the lug 154 can strike a trigger 160 during rotation. The trigger 160 can have a first end 161 and a second end 162. The first end 161 can be connected to a micro-switch that can detect small amounts of movement. The trigger 160 can be a spring or other material. The lug 154 can displace the trigger 160 during each revolution. It is appreciated that the lug 154 could rotate up to 360 degrees before striking the trigger. This could allow an amount of line 7 to be unwound before the trigger 160 is tripped.

A flag assembly 170 is provided having a post 180 and a flag 185. The flag assembly is best illustrated in FIGS. 11-14 The post is preferably a flexible post having a first end 181 and a second end 182. The first end 181 is secured to the back 40 of the housing.

A flag storage bracket 190 is provided having a clamp 191. The flag assembly 170 can be secured with the clamp 191 to be placed in a storage position.

A flag deployment assembly 200 is also provided. The deployment assembly 200 has a motor 210 in electrical communication with the power box. A pivoting arm 215 is connected to the motor 210. A catch arm 220 with a catch 221 is connected to the pivoting arm. The end 182 of the post can be positioned in the catch 221 putting the flag in the ready position. When the trigger 160 is tripped, the motor 210 activates to cause the pivoting arm to rotate. The catch arm 220 will similarly rotate and the flag will deploy when it can clear the sidewall of the catch 221 under the resiliency of the flag post.

Figure 5:
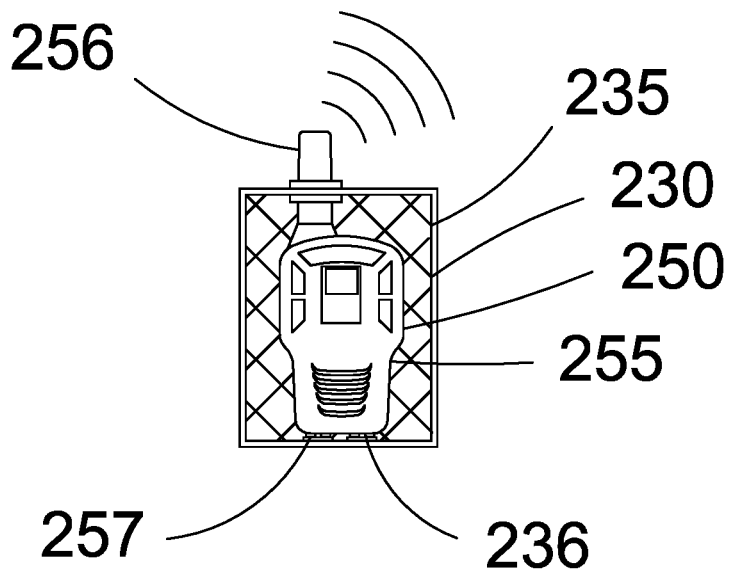
FIG. 5 is a close-up view taken on callout circle 5 in FIG. 3.
Figures 6, 7:
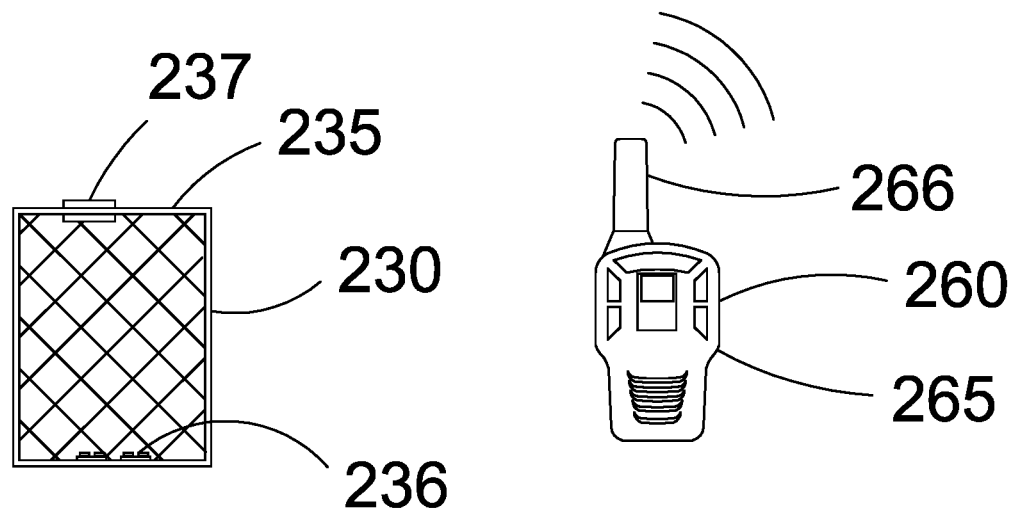
FIG. 6 is an isolation view of a communication box.
FIG. 7 is an isolation view of a communication device.
Figure 8:
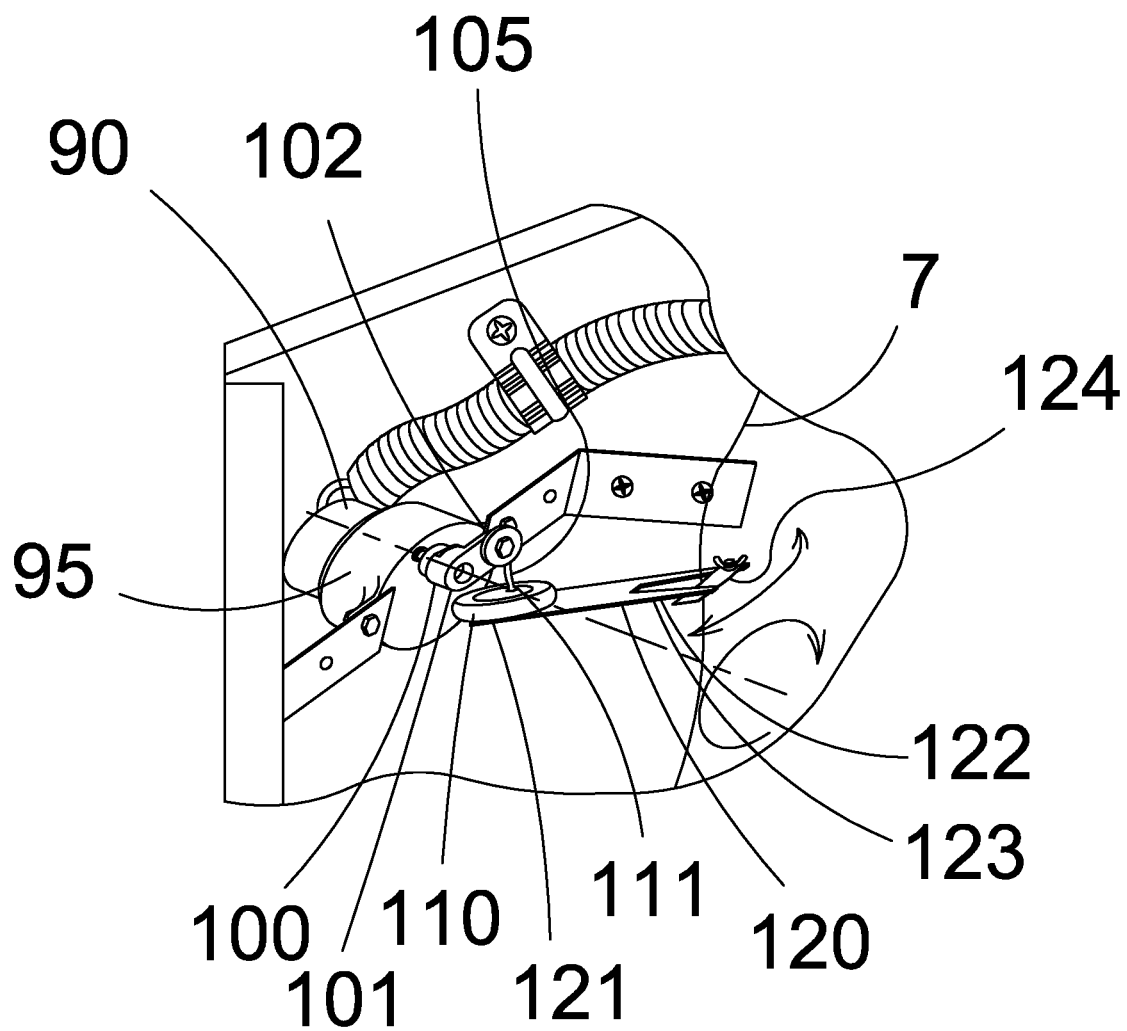
FIG. 8 is a close-up view taken on callout circle 8 in FIG. 3.
Figure 9:
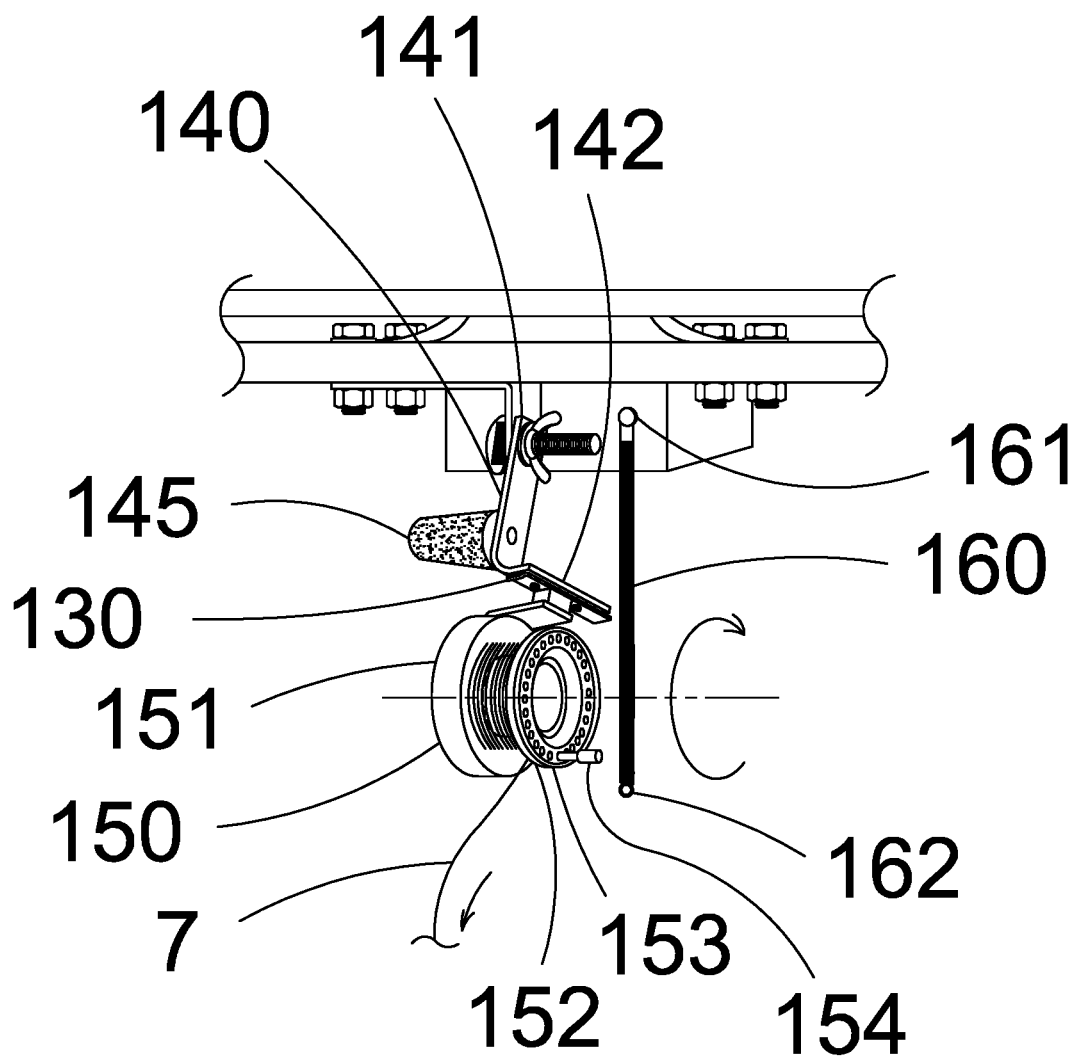
FIG. 9 is a close-up view taken on callout circle 9 in FIG. 3.
Figure 10:
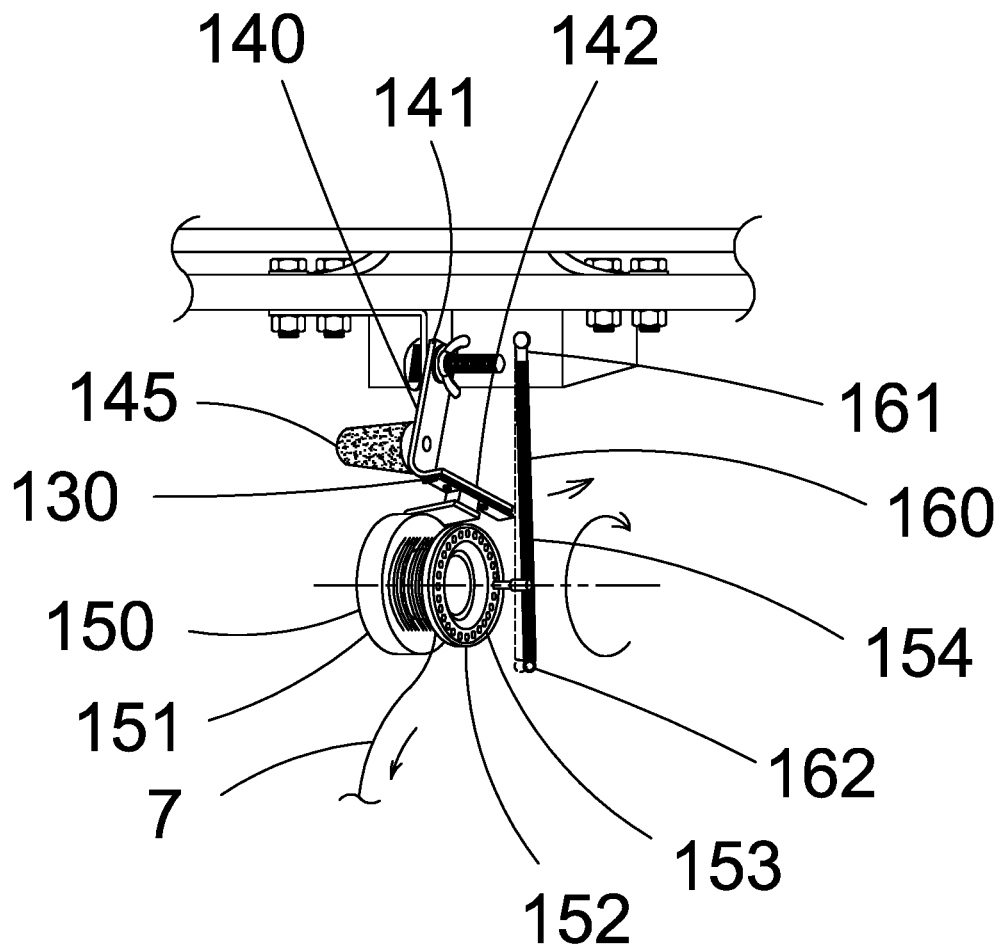
FIG. 10 is similar to FIG. 9, but shows a trigger being triggered.
Figure 11:
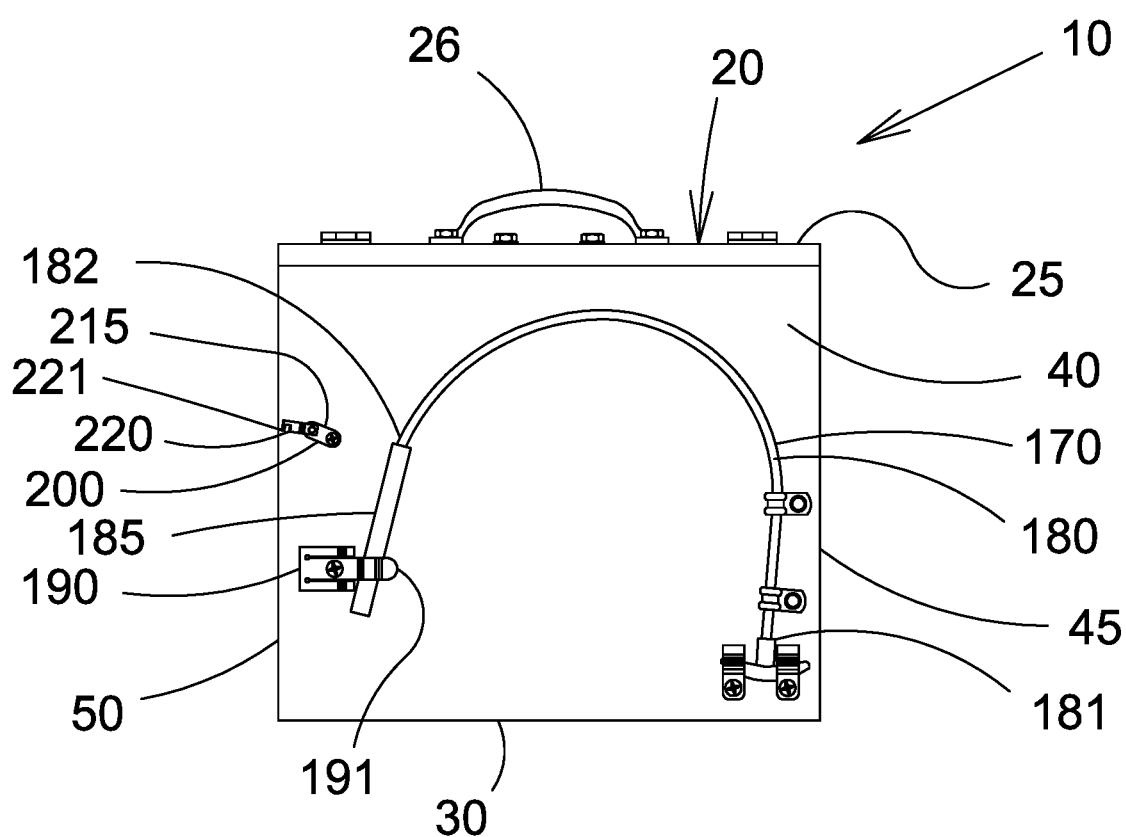
FIG. 11 is a back view of the embodiment illustrated in FIG. 1, shown with a flag in a storage position.
Figure 12:
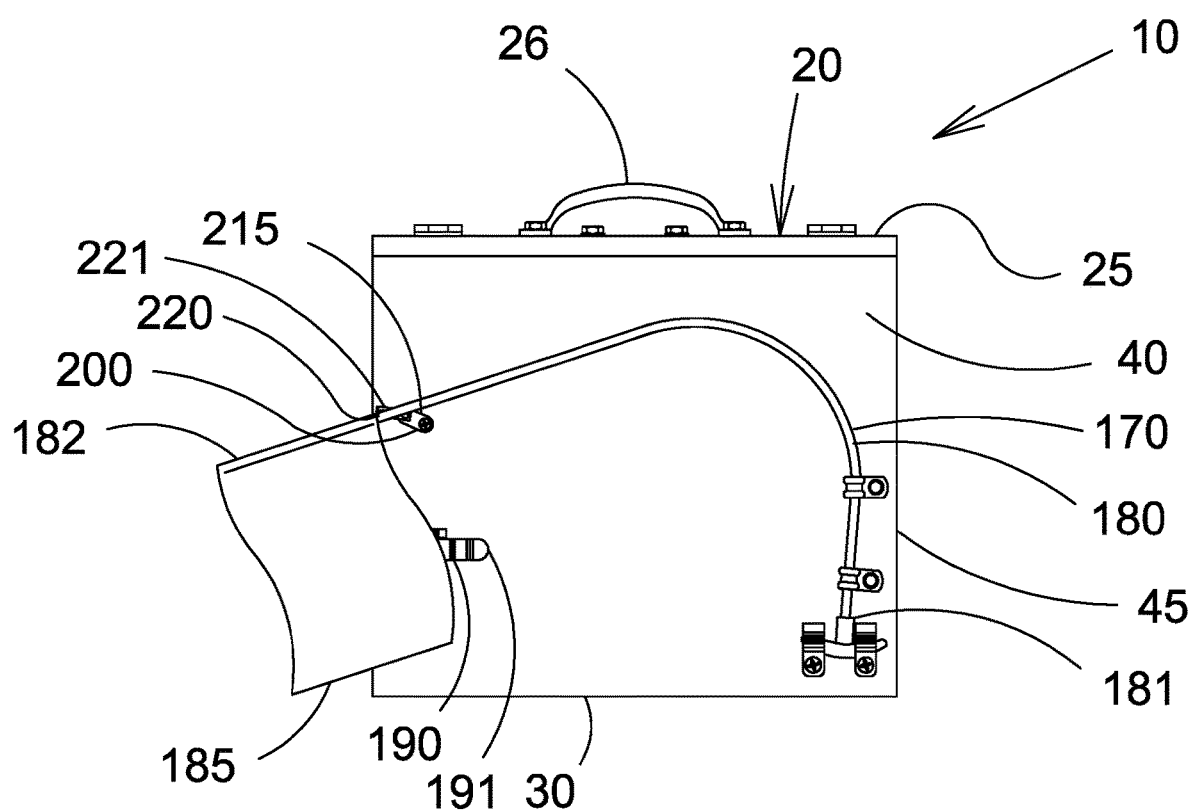
FIG. 12 is similar to FIG. 11, but shows the flag in a ready position.
Figure 13:
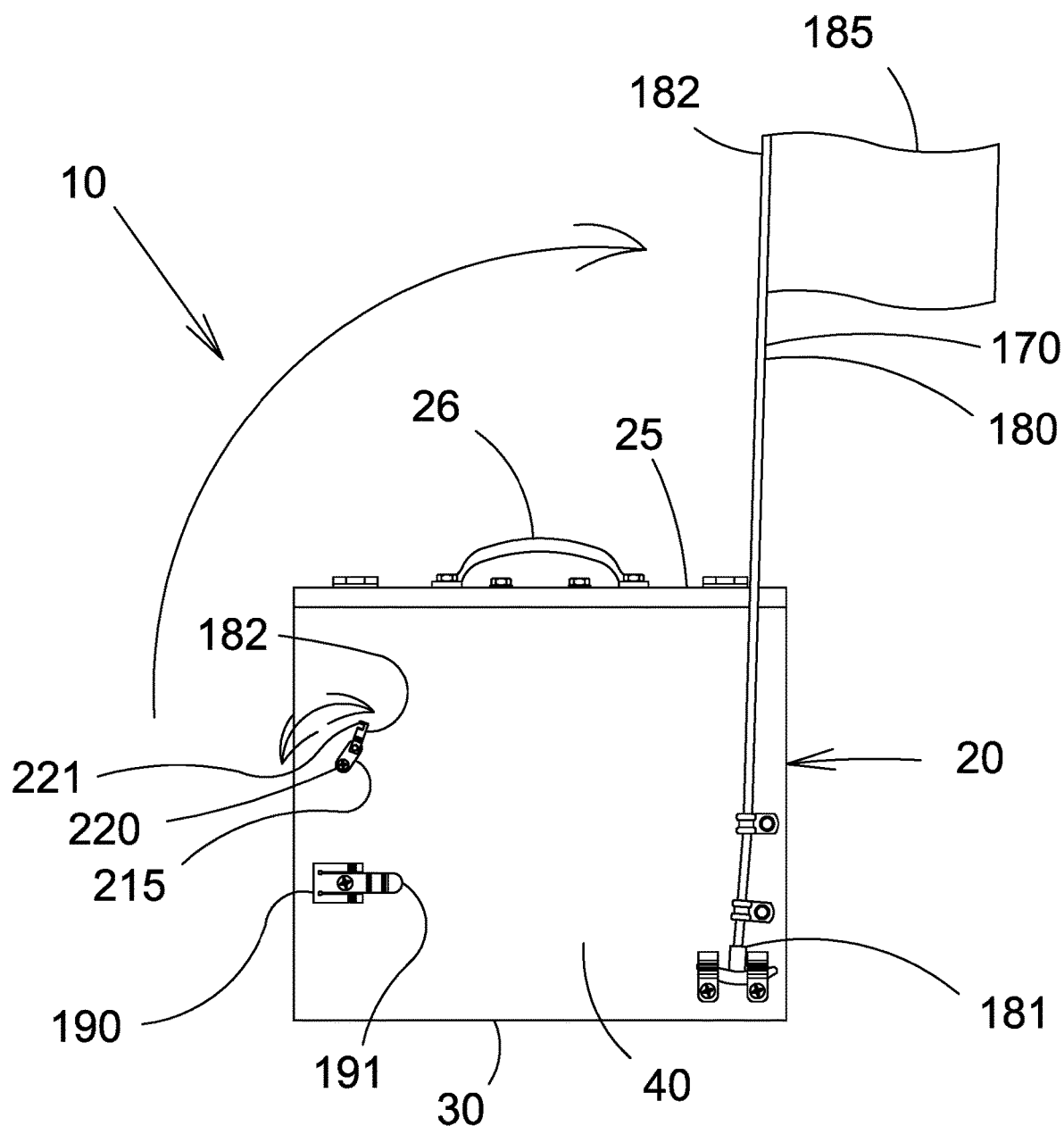
FIG. 13 is similar to FIG. 12, but shows the flag in a deployed position.
Figure 14:
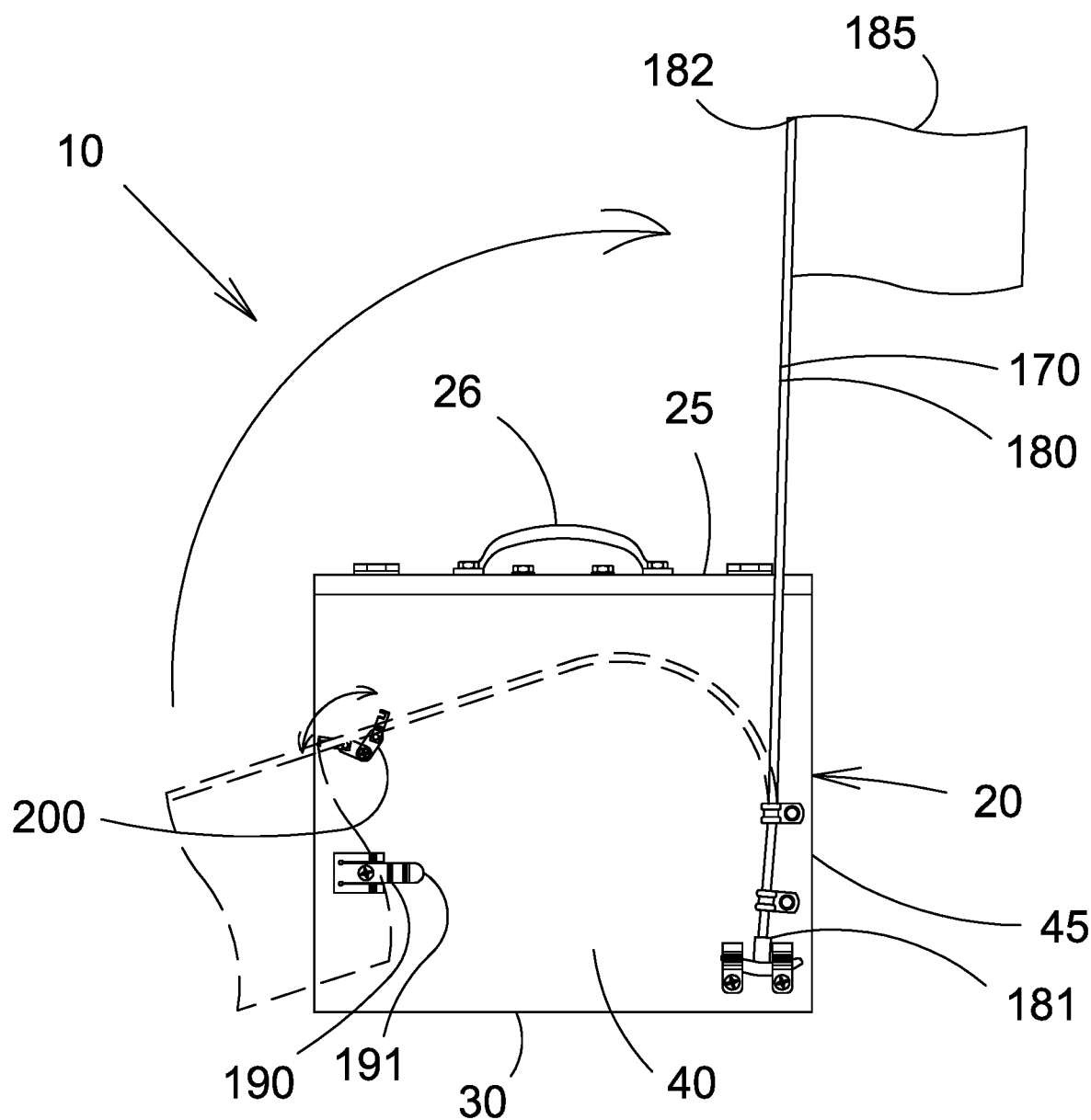
FIG. 14 is similar to FIG. 12, but shows the flag in the ready position in dashed lines and in the deployed position in solid lines.
Figure 15:
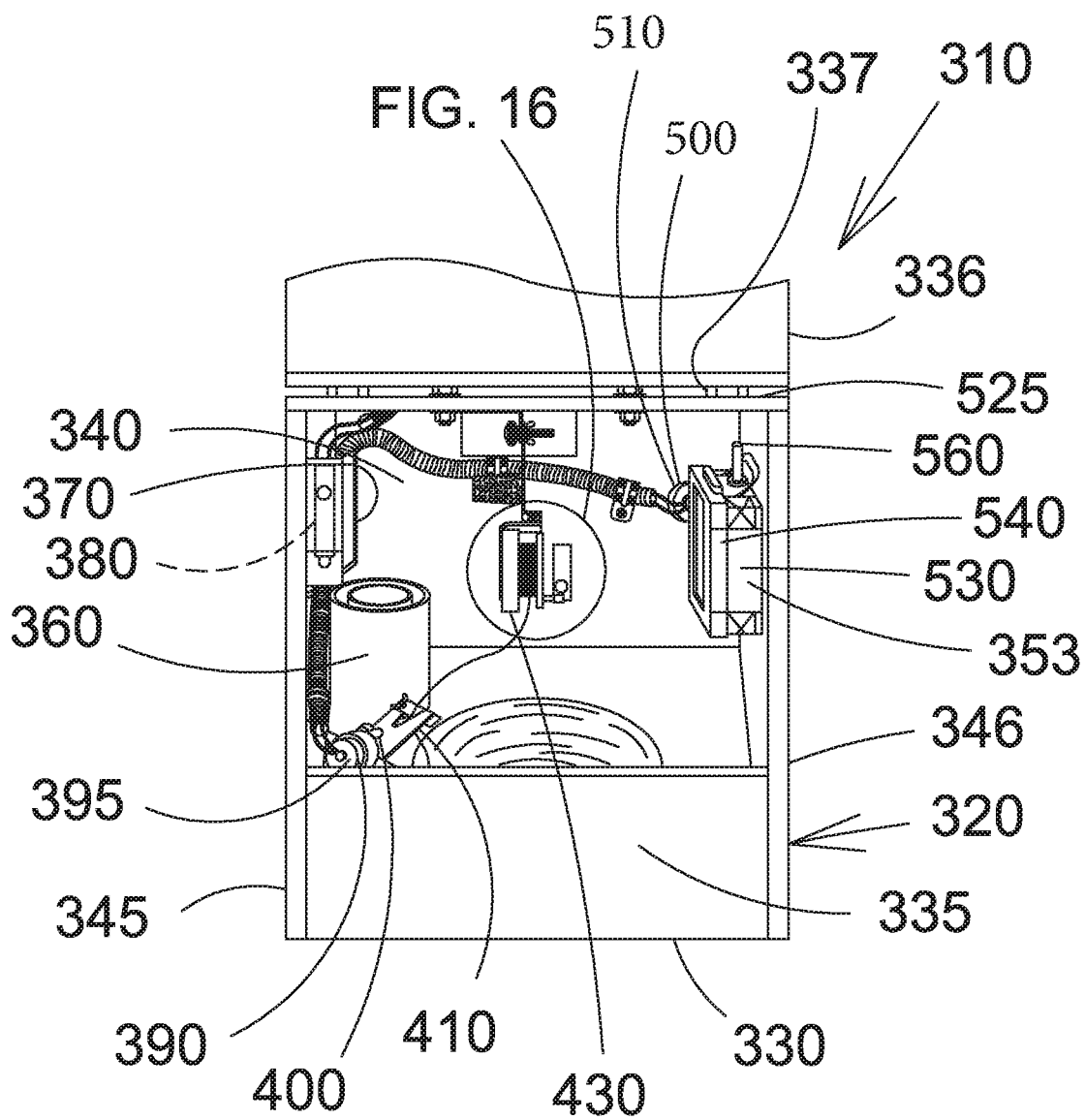
FIG. 15 is a front view of an alternative embodiment of the present invention.
Figure 16:
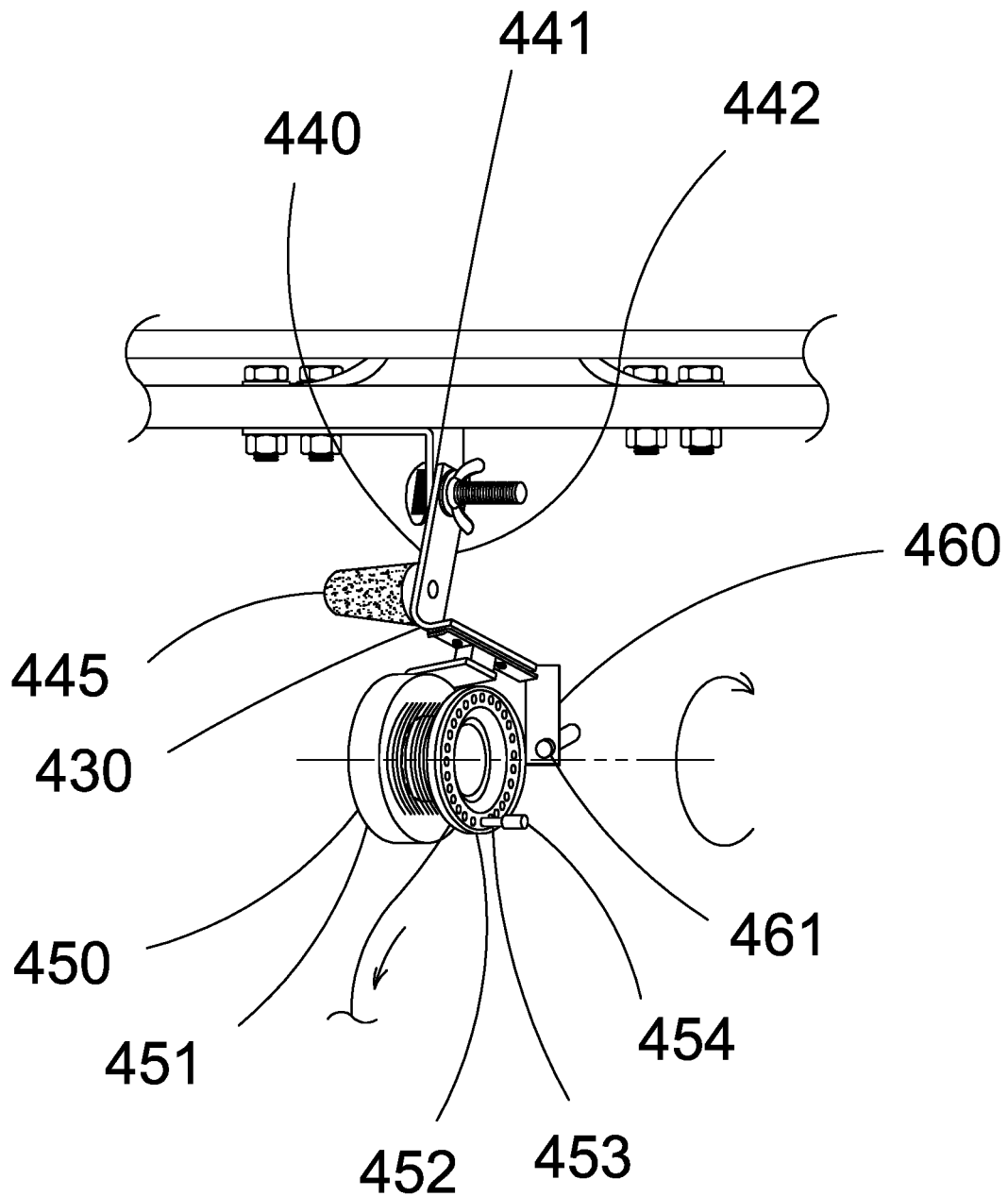
FIG. 16 is a close-up taken along callout circle 16 in FIG. 15.
Figure 17:
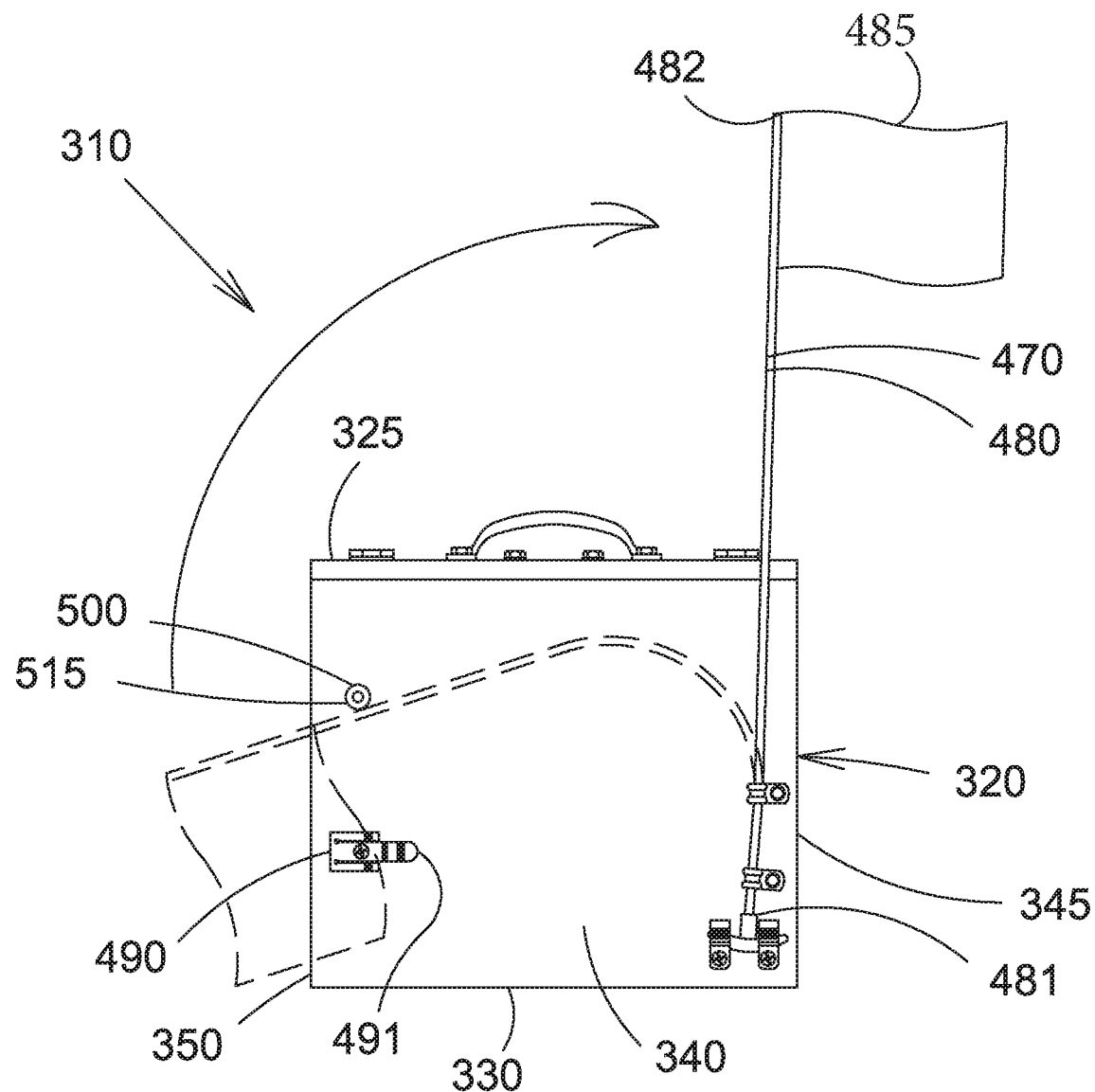
FIG. 17 is a rear view of an alternative embodiment of the present invention.
Figure 18:
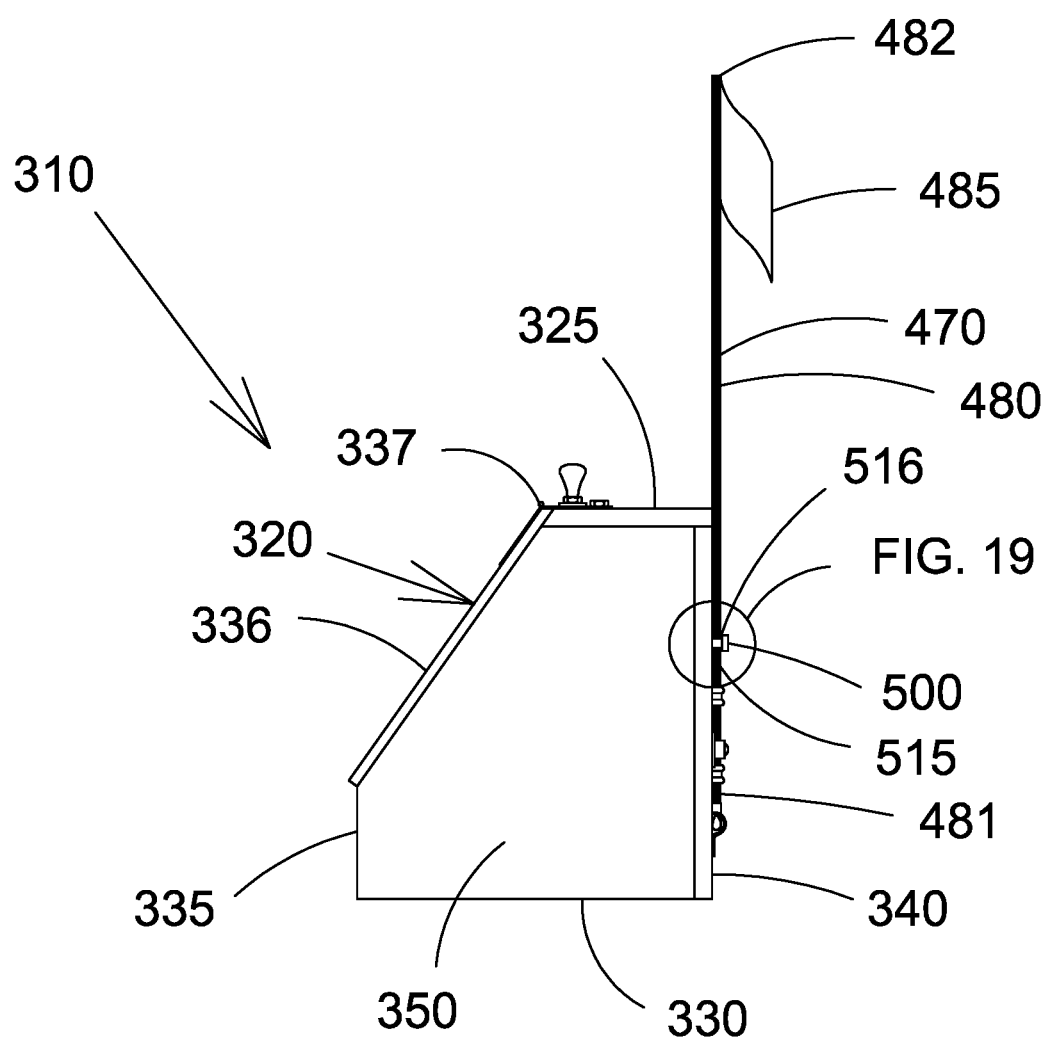
FIG. 18 is a side view of the embodiment illustrated in FIG. 17.
Figure 19:
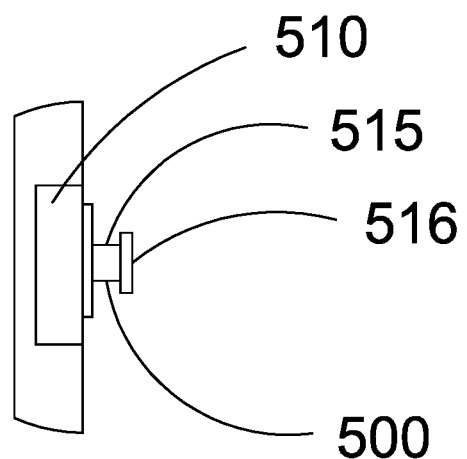
FIG. 19 is a close-up view of callout circle 19 in FIG. 18.
Figure 20:
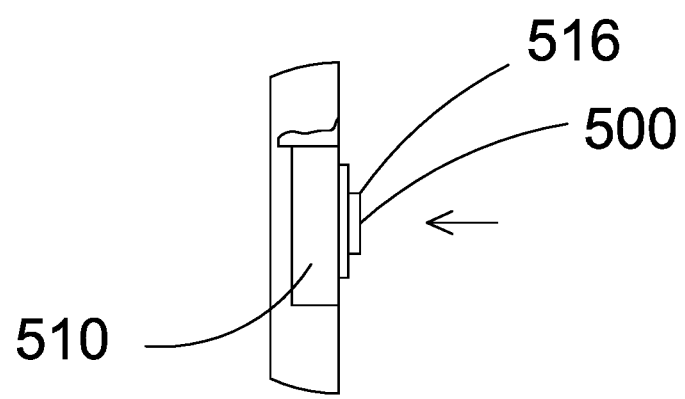
FIG. 20 is similar to FIG. 19 but shows the retainer in a retracted position.

A communication box 230 is further provided and is seen in isolation in FIG. 5. The communication box 230 has a body 235. Electrical contacts 236 are provided and can be at the bottom of the box. A hole 237 can be formed through the top of the box. A cover 240 can cover the front of the box. Removal of the cover 240 allows a user to insert a communication device 250 into the box 230. The communication device can be a radio having a body 255, an antenna 256 and electrical contacts 257. The antennal 256 can extend through hole 237. The electrical contacts 257 can be in electrical communication with contacts 236 of the box. The cover 240 can shield the communication device from water. When the trigger 160 is tripped, an electric signal is sent to the communication device to turn on. The communication device can cause a receiver 260 to indicate that the trigger is tripped. The receiver 260 can be a radio having a body 265 and an antenna 266. It is appreciated that the communication device is housed within the housing 20. Heating the housing 20 will cause the operational temperature of the communication device to be higher, which reduces battery draw when in use. The communication device 250 can have rechargeable batteries.

It is appreciated that two indicators are illustrated in the present invention. Both indicators are electrically powered wherein there is no mechanical interface between the trigger 160 and the respective indicators. Doing this eliminates the addition of any extra line tension.

In an alternative embodiment shown in FIGS. 15-20, the tip up 310 has a housing 320. The housing 320 has a top 325 with a handle. The housing also has a bottom 330 that is open with an opening. The opening can be sized to match the internal width and depth of the internal chamber. A front 335 is provided having a lid 336 pivotably or movable supported with hinges 337. The lid can be angled relative to a bottom portion of the front 335. The hinges 337 can be fixed to the top 325, preferably with one hinge on each side of the handle. A back 340 and two sides 345 and 350, respectively, are further provided. The lid 336 is movable between a closed position and an open position. In the open position, a user has access to the inside of the housing 320 and to the components contained therein. The lid is shown in an open position in FIG. 15.

Several components are preferably provided on the inside of the housing 320. On such component is a can 360 having a body with an opening. The opening is preferably located as the top of the can 360. A candle or other heat producing device can be placed into the can. The heating device can warm the interior of the housing 320, extending battery life of components and preventing the ice hole from freezing over.

A heat shield 370 is affixed to a sidewall and protects a power box 380 from directly receiving heat from the can 360. The power box 380 has a battery and contains a switch. The switch is an on/off switch.

A jigging assembly 390 is provided. The jigging assembly 390 has a motor 395 that is in electrical communication with the power box 380. A rotating arm 400 is provided having a proximal end and a distal end. The proximal end is connected to the motor and the distal end orbits about the proximal end under operation of the motor 395. A bar is provided. A weight depends from the bar. The weight is connected to the bar at an offset connection. The bar is rotatably connected to the distal end of the rotating arm 400. In this regard, the weight remains below the bar as the bar rotates due to gravity. A jigging arm 410 is connected to and extends from the weight. The jigging arm is generally angled upwards as it extends from the weight. The jigging arm 410 has a first end and a second arm. The first end is connected to the weight. Two fingers are at the second end. A line hold spans between the fingers. The line hold can provide a relatively small amount of resistance to keep a line 7 between the fingers. The line hole can be overcome with a slight amount of line tension on the line 7.

In use, the motor 395 turns the rotating arm 400. The distal end passes in an orbital path around the first end. The weight also passes in a generally orbital path that is defined by the path of the distal end of the rotating arm. The offset connection of the weight, and the internal friction between the bar and the rotating arm 400 introduce a wiggle in the weight wherein the weight fails to pass in a smooth orbit. The wiggle and the orbit are translated to the second end of the jigging arm 410. This irregular motion is imparted onto the line 7 so that a bait on the line does not move in a simple motion.

A reel assembly 430 is further provided. The reel assembly is seen in isolation in FIG. 16. A support arm 440 is provided having a first end 441 and a second arm 442. The first end 441 is pivotally connected to a hanger on the top 325 of the housing. The second end 442 is preferably angled approximately 90 degrees relative to the first end 441. A cork 445 is connected to the support arm 440. A hook on the end of a line 7 can be stored on the cork 445. A reel 450 is provided. The reel 450 has a base 451 with a rotating hub 452. The reel 450 can be a low resistance reel 450. The hub 452 has an outer lip 453. A lug 454 can be fixed to the outer lip. One use of the lug 454 is to wind a line onto the reel 450. The lug passes in an orbital path when a line 7 is unwinding. The support arm 440 can be adjusted in position so that the lug 454 can come into close proximity with a trigger 460 during rotation. The trigger 460 can have a sensor 461 that can sense when the lug is in close proximity causing the trigger 460 to trip. It is appreciated that the lug 454 could rotate up to 360 degrees before coming into close proximity with the contactless trigger. This could allow an amount of line 7 to be unwound before the trigger 460 is tripped.

A flag assembly 470 is provided having a post 480 and a flag 485. The flag assembly is best illustrated in FIGS. 17-20. The post is preferably a flexible post having a first end 481 and a second end 482. The first end 481 is secured to the back 340 of the housing.

A flag storage bracket 490 is provided having a clamp 491. The flag assembly 470 can be secured with the clamp 491 to be placed in a storage position.

A flag deployment assembly 500 is also provided. The deployment assembly 500 has a motor 510 in electrical communication with the power box. A retractable arm 515 is connected to the motor 510. A catch 516, which be a rim, is on the distal end of the retractable arm 515. The end 482 of the post can be positioned in the catch 516 putting the flag in the ready position. When the trigger 460 is tripped, the motor 510 activates to cause the retracting arm 515 to pull into the housing. The catch 516 will pull tight to a base, wherein the flag will deploy when the distance between the base and rim is less than 50% of the flag post diameter under the resiliency of the flag post.

A communication box 530 is further provided having a body 535 and a cover 540. A hole can be formed through the top of the box and there can be electrical contacts on the bottom of the box. Removal of the cover 540 allows a user to insert a communication device 560 into the box 530. The communication device can be a radio having a body, an antenna and electrical contacts. The antennal can extend through hole. The electrical contacts can be in electrical communication with contacts of the box. The cover 540 can shield the communication device from water. When the trigger 460 is tripped, an electric signal is sent to the communication device to turn on. The communication device can cause a receiver to indicate that the trigger is tripped. The receiver can be a radio having a body and an antenna.

Thus it is apparent that there has been provided, in accordance with the invention, an invention that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A tip up comprising:
   a housing;
   a reel located within said housing and being supported by said housing;
   an indicator observable from outside of said housing; and
   a jigging assembly located within said housing, said jigging assembly comprising:
   a motor;
   a rotating arm, said rotating arm having a proximal end and a distal end, said proximal end being connected to said motor, and said rotating arm being rotatable under operation of said motor;
   a bar rotatably connected to said distal end of said rotating arm;
   an offset weight depending from said bar; and
   a jigging arm, said jigging arm being connected to said offset weight and movable under at least one of rotation of said rotating arm and movement of said offset weight, wherein said jigging assembly can wiggle a bait during operation.

2. The tip up of claim 1 wherein said offset weight falls under force of gravity as said rotating arm rotates.

3. The tip up of claim 1 further comprising a trigger, wherein tripping of said trigger causes an electric signal to activate said indicator.

4. The tip up of claim 3 further comprising a communication box within said housing, said communication box containing a communication device that activates when said trigger is tripped.

5. The tip up of claim 3 wherein said indicator is a flag, said trigger causing another motor to release a flag from a ready position to a deployed position.

6. The tip up of claim 1 further comprising a trigger, said trigger being tripped by a lug located on said reel.

7. A tip up comprising:
   a housing;
   a reel located within the housing and being supported by said housing, said reel having a base and a hub, said hub supporting a line, said hub being unwound when a fish adds tension to the line, said hub having a lug thereon, said lug rotationally traveling with the hub;
   a trigger located within the housing within proximity of said reel, said trigger having a sensor that can sense when said lug is in close proximity to said sensor, said trigger electrically causing an indicator to provide an indication when said lug is in close proximity to said sensor; and
   a jigging assembly located within said housing, said jigging assembly having:
   a motor;

a rotating arm, said rotating arm having a proximal end and a distal end, said proximal end being connected to said motor, and said rotating arm being rotatable under operation of said motor;

a bar rotatably connected to said distal end of said rotating arm;

a weight depending from said bar in an offset manner; and a jigging arm, said jigging arm being connected to said weight.

8. The tip up of claim 7 wherein said lug rotationally travels up to 360 degrees before coming into close proximity with said sensor.

9. The tip up of claim 7 wherein said indicator is a flag supported on a post, said indicator being selectably deployed with a flag deployment assembly.

10. The tip up of claim 9 wherein said flag deployment assembly comprises:

another motor in electric communication with said trigger;

a pivoting arm; and a catch arm with a catch.

11. The tip up of claim 9 wherein said flag deployment assembly comprises:

another motor in electric communication with said trigger; and a retractable arm with a catch, said retractable arm being retracted into said housing under operation of said motor to release said flag.

12. The tip of claim 7 wherein:

said housing has an interior; and said tip up further comprises:

a heat source within said interior; and a communication box within said interior.

13. The tip up of claim 12 wherein:

said communication box has electric contacts;

said indicator is a radio having radio contacts in electrical communication with said electric contacts of said communication box; and said radio is protected from water by being within said box and protected from cold temperatures by being within said housing.

14. A tip up comprising:

a housing;

a reel located within said housing and being supported by said housing;

a jigging assembly located within said housing and comprising:

a motor;

a rotating arm, said rotating arm having a proximal end and a distal end, said proximal end being connected to said motor, and said rotating arm being rotatable under operation of said motor;

a bar rotatably connected to said distal end of said rotating arm;

a weight depending from said bar; and a jigging arm connected to said weight and movable under at least one of rotation of said rotating arm and movement of said weight;

a trigger located in proximity of said reel;

a communication box located within said housing, said communication box having communication box contacts; and a communication device, said communication device being in electrical communication with said communication box contacts, said communication device being a radio and being activated when said trigger is tripped by said reel to send a signal to a receiver.

15. The tip up of claim 14 wherein said trigger is a mechanical trigger operating with a micro switch, and said reel has a lug that contacts said trigger.

16. The tip up of claim 14 wherein said trigger is an electronic trigger that trips when a portion of said reel comes into close proximity to said trigger.

17. The tip up of claim 14 further comprising a flag and a flag deployment mechanism utilizing another motor.

\* \* \* \* \*